United States Patent
Cmielowski et al.

(10) Patent No.: US 12,555,030 B2
(45) Date of Patent: Feb. 17, 2026

(54) PROVIDING A MACHINE LEARNING MODEL BASED ON DESIRED METRIC VALUES

(71) Applicant: International Business Machines Corporation, Armonk, NY (US)

(72) Inventors: Lukasz G. Cmielowski, Cracow (PL); Daniel Jakub Ryszka, Cracow (PL); Wojciech Sobala, Cracow (PL); Jan Soltysik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 17/412,474

(22) Filed: Aug. 26, 2021

(65) Prior Publication Data

US 2023/0068816 A1 Mar. 2, 2023

(51) Int. Cl.
*G06N 20/00* (2019.01)
*G06F 3/04842* (2022.01)
(Continued)

(52) U.S. Cl.
CPC ......... *G06N 20/00* (2019.01); *G06F 3/04842* (2013.01); *G06F 3/04847* (2013.01);
(Continued)

(58) Field of Classification Search
CPC .... G06N 20/00; G06N 20/10; G06F 3/04842; G06F 3/04847; G06F 18/214; G06F 18/217; G06F 18/40
See application file for complete search history.

(56) References Cited

U.S. PATENT DOCUMENTS

| 2016/0110657 A1 | 4/2016 | Gibiansky |
| 2018/0240010 A1 | 8/2018 | Faivishevsky |

(Continued)

FOREIGN PATENT DOCUMENTS

| CN | 117716373 A | 3/2024 |
| EP | 4392908 A1 | 7/2024 |

(Continued)

OTHER PUBLICATIONS

"Notification of Transmittal of the International Search Report and the Written Opinion of the International Searching Authority, or the Declaration", From the International Searching Authority, International application No. PCT/E P2022/073450, International filing date: Aug. 23, 2022, Date of Mailing: Jan. 10, 2023, 18 pgs.

(Continued)

*Primary Examiner* — Tan H Tran
(74) *Attorney, Agent, or Firm* — Caleb D. Wilkes (57) ABSTRACT

The present disclosure relates to a method for generating a machine learning (ML) model. The method comprises: receiving a selection of a desired value of the metric for predicting a value of the first label attribute based on a current training dataset. Previously obtained sets of training settings may be used for determining a set of training settings that corresponds to the desired value of the metric. A ML engine may be controlled to generate using the current training dataset a machine learning model according to the determined set of training settings. The generated machine learning model may be deployed for performing predictions of values of the first label attribute.

19 Claims, 6 Drawing Sheets

(51) Int. Cl.
  *G06F 3/04847* (2022.01)
  *G06F 18/21* (2023.01)
  *G06F 18/214* (2023.01)
  *G06F 18/40* (2023.01)
  *G06N 20/10* (2019.01)
(52) U.S. Cl.
  CPC .......... *G06F 18/214* (2023.01); *G06F 18/217* (2023.01); *G06F 18/40* (2023.01); *G06N 20/10* (2019.01)

(56) References Cited

U.S. PATENT DOCUMENTS

| | | | |
|---|---|---|---|
| 2020/0057958 | A1 | 2/2020 | Moore et al. |
| 2020/0097847 | A1* | 3/2020 | Convertino ......... G06F 11/3447 |
| 2020/0167691 | A1 | 5/2020 | Golovin |
| 2020/0380378 | A1* | 12/2020 | Moharrer ................ G06N 20/20 |
| 2021/0174210 | A1 | 6/2021 | Hsyu et al. |
| 2021/0241108 | A1 | 8/2021 | Chai et al. |
| 2021/0326717 | A1* | 10/2021 | Mueller ................. G06Q 10/06 |
| 2022/0035908 | A1* | 2/2022 | Huang .................... G06F 21/55 |

FOREIGN PATENT DOCUMENTS

| | | |
|---|---|---|
| JP | 2017-529583 A | 10/2017 |
| JP | 2024-531141 A | 8/2024 |
| WO | 2019211367 A1 | 11/2019 |
| WO | 2023/025781 A1 | 3/2023 |

OTHER PUBLICATIONS

Mell et al., "The NIST Definition of Cloud Computing", Recommendations of the National Institute of Standards and Technology, NIST Special Publication 800-145, Sep. 2011, 7 pages.

Japan Patent Office, "Notice of Reasons for Refusal" Nov. 27, 2025, 09 Pages JP Application No. 2024-507905.

* cited by examiner

201 {
DATA
data.drop_duplicates=True
data.train_sample_size=0.5
data.compute_feature_importance=True 202 {
MODEL SELECTION
model_selection.max_model_num=1
model_selection.include_only_estimators=['RandomForestRegressorEstimator','ExtraTreesRegressorEstimator','RidgeEstimator','LinearRegressionEstimator','LGBMRegressorEstimator']
model_selection.hpo.run_hpo=True
model_selection.hpo.iter_threshold=15

203 {
FEATURES ENGINEERING
features_engineering.run_flag=True
features_engineering.max_iterations=30
features_engineering.max_search_level=3
features_engineering.transform_names=['sqrt','log','square','stdscaler','minmaxscaler','pca','nxor','featureagglomeration','isoforestanomaly']
features_engineering.subsample_size=0.2
features_engineering.hpo.run_hpo=True
features_engineering.hpo.iter_threshold=30

210
- training data size
- training data features number
- training data features types (e.g: string, int, float etc.)
- training data TARGET column type
- trainig data TARGET column classes number
- experiment problem type (e.g: classification, regression)
- number of selected estimators
- estimators list

PROVIDING A MACHINE LEARNING MODEL BASED ON DESIRED METRIC VALUES

BACKGROUND

The present invention relates to the field of digital computer systems, and more specifically, to a method for providing a machine learning model based on desired metric values.

Machine learning models are being integrated in many software systems such as database transaction processing systems. These models may be very complex to implement. The training and inference of such models may however require tunning several parameters.

SUMMARY

Various embodiments provide a method, computer system and computer program product as described by the subject matter of the independent claims. Embodiments of the present invention can be freely combined with each other. The embodiments presented herein this disclosure are not exhaustive. That being said, numerous additional embodiments not mentioned may exist within the scope and spirit of this disclosure.

Embodiments of the present invention may include a computer-implemented method, a computer program product, and a computer system. The embodiments may allow for defining a metric for evaluating performances of machine learning (ML) models. The embodiments may also include providing an ML engine or similar computer program configured to receive a set of training settings and a training dataset comprising a first feature attribute and a first label attribute. The embodiments may also include generating at least one machine learning model according to the set of training settings and the training dataset. The embodiments may also include configuring the machine learning model to predict the first label attribute from the first feature attribute. Further, embodiments may also include providing a value of the metric for the generated machine learning model. Also, embodiments may include obtaining sets of training settings of previous operations of the ML engine and associated values of the metric and receiving a selection of a desired value of the metric for predicting a value of the first label attribute based on a current training dataset. Additionally, the embodiments may include determining a set of training settings that corresponds to the desired value of the metric, based on the obtained sets of training settings. Further, embodiments may include generating a machine learning model based on the determined set of training settings and the current training dataset. Lastly, embodiments may include deploying the generated machine learning model for performing predictions of values of the first label attribute.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Automated machine learning may be a process of automating, by a ML engine, the tasks of applying machine learning to real-world prediction problems. The ML engine may cover the complete pipeline from the raw dataset to the obtaining of a deployable machine learning model. The ML engine may be configured, in each experiment run, to generate one or more machine learning models from a training dataset based on a defined prediction problem. For that, the ML engine may use a set of settings which are configuration parameters such as a list of learning algorithms. The setting may be a parameter and its associated value. Tunning the setting may comprise changing the value of the parameter of the setting. Each experiment run may be associated with experiment metadata descriptive of the experiment run. The experiment metadata may, for example, describe the prediction problem. For that, the experiment metadata may comprise attributes descriptive of the prediction problem, such as an attribute describing the number/type of the feature attributes and an attribute describing the label attribute of the training dataset. The ML engine may generate the models for predicting the label attribute from the one or more feature attributes. For example, the feature attributes may be attributes descriptive of products and the label attribute may indicate a level of system satisfaction regarding the product. The ML engine may generate models to predict the satisfaction based on product attributes. In another example, the prediction problem may be predicting if a new client system will subscribe (yes/no) a term deposit based on demographic attributes associated with client systems.

Although the high automation in the ML engines may allow the usage of machine learning models, there may still be a need to provide adequate settings of the ML engines in order to obtain specific target performances. There may be a further need to prevent tuning the settings of the ML engines several times in order to obtain a desired performance target. However, this may be challenging because the number of these settings may be very high (e.g., 100), rendering the task of finding, training and thereafter inferring the model a tedious, long, and computing resource intensive task. In addition, the performance variation may be attributed to just a few settings which may need further resources to be identified. The present subject matter may solve these issues by using previous sets of settings and their achieved performances. This may be advantageous as the previous sets of settings may be obtained from several sources where accurate results are obtained. The set of settings that the system may use according to the present subject matter may be a pre-tuned set of settings or may be predicted by a prediction model. In both cases, the system may have to define a target performance value, to obtain the desired machine learning model without tuning the settings. This may save processing resources that would otherwise be required by several iterations to define and tune the individual settings.

The ML engine may be used by multiple systems for generating machine learning models. The present subject matter may enable to save processing inputs and outputs of the ML engine. For each prediction problem, a pair of metric values and corresponding set of training settings may be saved. For example, a first prediction problem may be to predict a feature L1 from features F1 and F2, a second prediction problem type may be to predict a feature L2 from features F3, F4 and F5, etc. After saving these pairs, the system may define a desired metric value and one of the prediction problems in order to obtain the set of training settings that are suitable for the system (e.g., the system may be configured to predict L1 from F1 and F2 from a new training dataset that reflects the content the system is processing). In this case, the saved sets of settings associated with the same prediction problem may be used to determine the set of settings for generating a model from the new training dataset.

In an embodiment, determining the set of training settings may include, creating a training set from an entry of each set of training settings. Each entry may include an input vector and an associated output vector. The input vector may include the value of the metric and metadata descriptive of the attributes. The output vector may include the set of training settings. Additionally, training a predictive model using the training set to predict the set of settings by providing as the input to the predictive model the desired value of the metric and metadata for the attributes of the current training dataset and receiving as output the determined set of settings. The predictive model may be a multi-target regression model.

The predictive model may be used to predict the set of settings for each desired metric value. The system may provide as input to the predictive model the desired metric value and a definition of the prediction problem. The prediction problem may be defined by experiment metadata describing the feature and label attributes (e.g., their numbers and types). Following the above example, the system may be configured to predict the satisfaction level for products with a precision of 90% or better. In this case, the system may input to the predictive model the desired precision value of 90% and experiment metadata. The experiment metadata provides a description of the feature attributes which are attributes of the products and a description of the label attribute which is the level of satisfaction. The prediction model may provide as output a set of settings that the system may use as input for the ML engine to generate machine learning models. This embodiment may be advantageous as it may provide accurate estimations of the settings. This may particularly be advantageous as the training set may be obtained from different sources with different content of the attributes.

According to one embodiment, determining the set of settings may include, selecting the set of settings of the obtained set of settings that correspond to the desired value of the metric. This may enable a simplified method for obtaining the set of settings from existing settings.

According to one embodiment, the set of training settings may be a first subset of settings for pre-processing the training dataset, a second subset of settings for selection of one or more learning algorithms that are suitable for the prediction and a third subset of settings for training optimization.

The first subset of settings may be advantageous for the following reasons, the training datasets may have different data formats, duplicate values and missing values, but machine learning algorithms may need to work with consistent or same format and no missing values. To enable this, the ML engine may apply various algorithms, or estimators, which may analyze, clean, and prepare the training dataset. The first subset of settings may control this task of pre-processing the training dataset. An example setting of the first subset of settings may be a parameter named "drop_duplicate" whose value may be set to "true" or "false", so that if it is "true", the preprocessing may involve deduplication of the training dataset.

The second subset of settings may be advantageous for the following reasons. The ML engine may include a set of machine learning algorithms. For a given training dataset and prediction problem, the ML engine may select one or more learning algorithms from the set of algorithms to produce a model based on the given training dataset. For example, the ML engine may test and rank candidate algorithms against small subsets of the data and gradually increase the size of the subset for the most promising algorithms to arrive at the selected algorithms.

The third subset of settings may be advantageous for the following reasons. The number of hyperparameters of machine learning algorithms grows exponentially which puts optimization of the machine learning algorithm beyond the abilities of a data science team to accomplish in a manual and timely fashion. The ML engine may enable automated hyperparameter optimization (HPO), relieving teams of the intensive responsibility to explore and optimize across the full event space for hyperparameters. An example of the third subset of settings may be a flag to indicate whether or not perform optimization of the hyperparameters. A hyperparameter is a parameter whose value is used to control a learning process of a machine learning model (By contrast, the values of other parameters such as node weights are derived via training). In addition, the third subset of settings may enable feature engineering. Feature engineering refers to a transformative process to derive new information from existing feature attributes e.g., the feature attributes may be transformed into a combination of features that best represents the problem to achieve the most accurate prediction.

In an embodiment, metadata (which is also referred to as experiment metadata) descriptive of the attributes may include the number of feature attributes, the type of the feature attributes, and/or the type of the label attribute.

In an embodiment, the method further may include normalizing the metric values to a range of discrete value with a predefined granularity. The obtained sets of the settings can be provided according to the granularity, so that each set of the obtained sets of settings represents a respective level of granularity. The range may be defined by a minimum value, maximum value, and a step value or granularity. Providing a defined range may enable uniform access to the set of settings. This may particularly be advantageous in cases where multiple users are involved (e.g., the users are provided with defined set of values to choose from). For example, the range may be 0.0 to 1.0 with step/granularity of 0.1. That is, the possible values of the metric may be one of the 10 values 0.1, 0.2, 0.3, 0.4, 0.5, 0.6, 0.7, 0.8. 0.9 and 1.0. The values of the metric may be normalized so that they fit within the range. Each metric value of the 10 values may be associated with one or more sets of trainings settings that were previously used by the ML engine. In this way, a system may only select the granularity level (e.g., 0.3) to get the corresponding set of training settings.

If the metric is a combination of more than one metric type (e.g., precision and runtime) the same range may be used to represent the two metric types. For example, one metric type may have the value V of the range, while the other metric type has the value 1-V and the metrics have been configured to sum up to one (e.g., if the precision is 0.9 the speed will be 0.1). This may enable an efficient selection of the metric value in a multidimensional space without having to select individually the metrics.

In an embodiment, receiving the selection may include receiving a selection of a granularity level.

In an embodiment, receiving the selection may include displaying on a graphical user interface a slider which may allow a user to set a value by moving an indicator of the slider, the slider comprising the range of normalized values, wherein the set value of the slider is the received selected value of the metric. The slider may efficiently control the operation of the ML engine as a user of the system may have just to slide the indicator.

In an embodiment, the metric may describe a runtime of the training and/or inference of the machine learning model, including the accuracy and/or precision of the machine learning model or a combination thereof. The accuracy gives a measure of the number of correct predictions made by the model. It may be the ratio of correct predictions to total predictions. The precision may indicate how correctly the model has detected the positive outcomes. It may be the ratio of true positives to the total positives.

In an embodiment, the metric can be a combination of multiple metric types. Each metric type can be associated with a distinct set of settings from the sets of settings. For example, the metric type may be precision, accuracy, runtime, etc. Runtime may be the time needed for training the generated model(s). A combination of two metric types allows for the measurement of both metric types. In the case of a metric comprising a combination of two or more metric types, selection of the metric value may be a value of at least one the metric types and saved/logged sets of settings that are associated with the values of the metric types. For example, if the metric is a combination of precision and runtime, the user may select either the desired runtime value and/or the desired precision (e.g., each set of training settings may be associated with a pair of values of the precision and runtime).

In an embodiment, the method may also include saving the determined set of settings and the value of the metric associated with it. For example, the determined set of settings may be stored in association with the desired metric value and the experiment metadata, so they can be used for future determinations of metric values. This may enable a self-improving system (i.e., a machine learning feedback loop).

Figure 1:
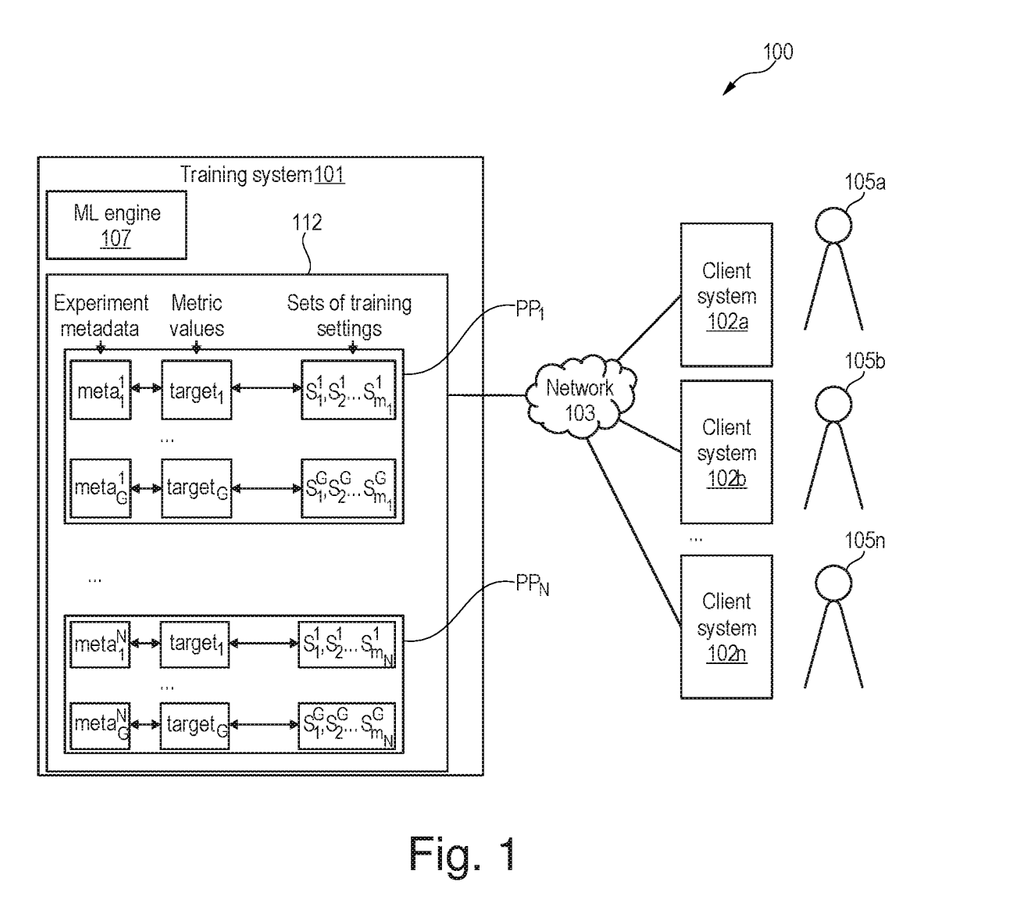
FIG. 1 illustrates an exemplary computer system, generally designated 100, in accordance with embodiments of the present disclosure.

Now giving attention to the figures, FIG. 1 illustrates a computer system 100 in accordance with an embodiment of the invention. The computer system 100 comprises training system 101 and client systems 102a, 102b, 102n. It should be noted, while three client systems are depicted in FIG. 1, any number of client systems may be present in computer system 100 (e.g., 1, 2, n . . . n+1). Training system 101 may be configured to communicate with each of the client systems 102a-n via network 103. It should be noted, for simplification of the description only one network is shown, however, training system 101 may connect to client systems 102a-n via more than one network (e.g., training system 101 may connect to each of client systems 102a-n via a respective separate network).

Network 103 may include, but is not limited to, a cable network, an optical fiber network, a hybrid fiber coax network, a wireless network (e.g., a Wi-Fi and/or mobile telephone network), a satellite network, the Internet, an intranet, a local area network, and/or any combination of these networks.

As shown, users 105a-n of client system 102a-n may include an individual such as a viewer, owner, support technician, or a device, machine learning system or an artificial intelligence system. Training system 101 may be provided as a single server device or multiple server devices operating in a cloud computing configuration.

Training system 101 may be remote to the client systems 102a-n and accessible over the network 103. Training system 101 may provide resources for training, operating, and storing machine learning models. Performance of the machine learning models may be quantified by a defined metric. The metric may be one metric type or a combination of multiple metric types (e.g., the metric may be a runtime and/or precision and/or accuracy of the machine learning model). Training system 101 includes ML engine 107. ML engine is a computer program that can be configured to generate machine learning models, for example, AutoAI of IBM®. For example, ML engine 107 may generate machine learning models for different prediction problems. Further, ML engine 107 may process a prediction problem per experiment run. Additionally, ML engine 107 may receive a set of training settings $s_1, s_2 \ldots s_m$ and a training dataset comprising one or more feature attributes and a label attribute, in each experiment run. In some cases, experiment metadata may be provided. Experiment metadata describes the experiment run (e.g., the experiment metadata describes the prediction problem).

Figure 2:
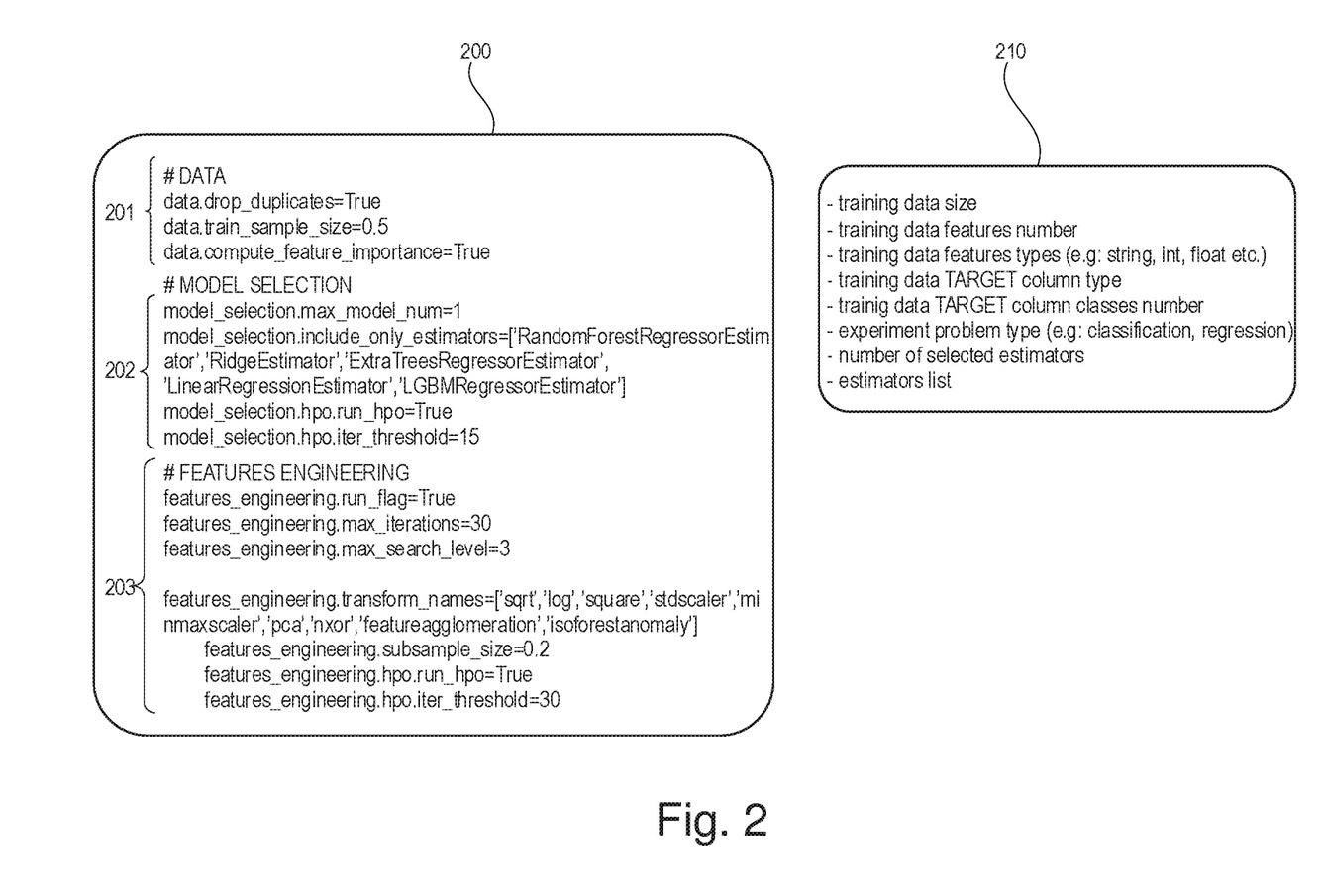
FIG. 2 illustrates an example set of settings in accordance with embodiments of the present disclosure.

FIG. 2 depicts an example of experiment metadata 210. Experiment metadata 210 includes attributes describing the prediction problem and training data. ML engine 107 may use the set of settings $s_1, s_2 \ldots s_m$ (as shown in FIG. 1) for generating one or more machine learning models that may predict the label from the one or more features. Additionally, each of the generated machine learning models may be associated with a value of the metric indicating the performance of the machine learning model. Training system 101 may be configured to log or save the activities of ML engine 107. Training system 101 may further comprise a storage system 112. Storage system 112 may include for each prediction problem (PP) of previously processed prediction problems $PP_1 \ldots PP_N$, where $N \geq 1$, G tuples, each tuple may be the metric value for one or more sets of settings and experiment metadata. For simplification of the description, FIG. 1 describes one set of settings per one metric value. In the instant case, the number G of tuples is the number of experiment runs. G may also represent a granularity of the values of the metric. As shown in FIG. 1, the prediction problem $PP_1$ is associated with tuples including the tuple $\{target_1, meta_1^1, [s_1^1, s_2^1 \ldots s_{m_1}^1,]\}$ indicating the metric value $target_1$ in association of the set of $m_1$ settings (the upper index in $s_1^1$ refers to the prediction problem) and the experiment metadata $meta_1^1$ (the upper index in $meta_1^1$ refers to the prediction problem and the lower index in $meta_1^1$ refers to the granularity level of the metric). The sets of settings associated with the same prediction problem, may have the same type and number of settings but different values (e.g., the set of settings shown in FIG. 2 may be the settings of the prediction problem $PP_1$). However, the values assigned to each of the settings may be different for different experiment runs. The set of settings associated with a prediction problem may be different in number and/or type compared to another prediction problem. For example, the set of settings for the prediction problem $PP_2$ may be a subset of the set of settings for the prediction problem $PP_1$ and thus they differ by the number of settings. The G experiment runs associated with a prediction problem may involve the same attributes in the training dataset but the content (i.e., attribute values) of the training datasets may be different. For example, if the prediction problem is to predict a feature L1 from features F1 and F2, all the training datasets used in the G experiment runs of the same prediction problem may comprise at least three columns representing F1, F2 and L1. The contents of the three columns in the training datasets may be different.

For example, the set of training settings 200 shown in FIG. 2 may allow for a model with a precision value of 0.89 and runtime value of 1028 seconds. Set of settings 200 includes first subset of settings 201, for pre-processing the training dataset, second subset of settings 202, for the selection of one or more learning algorithms that are suitable for a prediction, and third subset of settings 203, for training optimization. Additionally, as depicted in FIG. 2 first subset of settings 201 includes the sample size of the training data which is set to value 0.5 and may indicate whether or not to deduplicate the training data as depicted set in FIG. 2.

Figure 3:
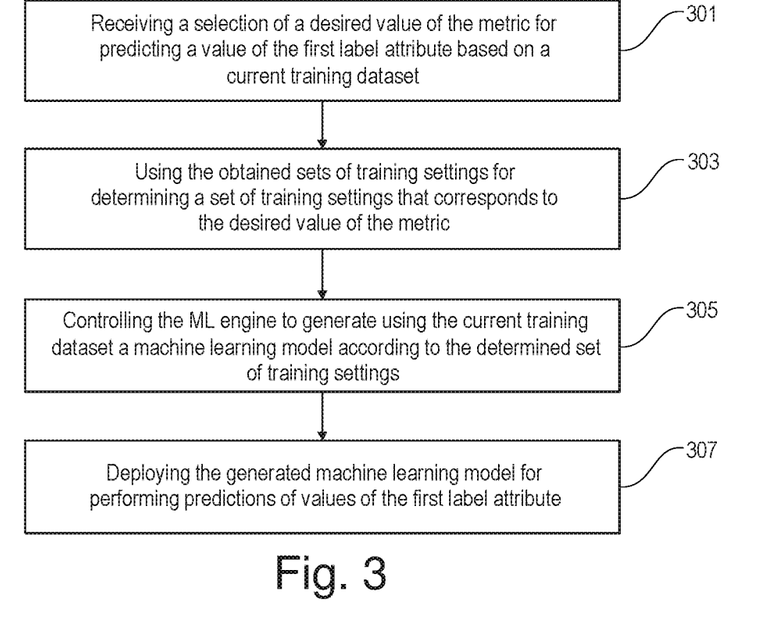
FIG. 3 is a flowchart of a method for providing a machine learning model in accordance with embodiments of the present disclosure.

FIG. 3 is a flowchart of a method for generating a machine learning model in accordance with an example of the present subject matter. For the purpose of explanation, the method described in FIG. 3 may be implemented in the system illustrated in FIG. 1 but is not limited to this implementation. The method of FIG. 3 may, for example, be performed by one of client systems 102a-n or by training system 101.

A selection of a desired value of the metric may be received in step 301. The desired value may automatically be selected by the client system 102a. For example, client system 102a may be configured to generate a model with a precision of 0.9 for a prediction problem that is part of prediction problems $PP_1 \ldots PP_N$ previously processed by ML engine 107. An experiment run may be defined. In one example implementation of step 301, a graphical user interface may be displayed on client system 102a to user 105a. User 105a of the client system 102a may use a control element of the graphical user interface to select the desired value of the metric. The selected value may be sent to training system 101. User 105a may be a device, machine learning system or an artificial intelligence system.

Experiment metadata describing the experiment run may be provided. The selection may optionally further indicate the experiment metadata. The experiment metadata may describe the prediction problem of user 105a. The prediction problem may be one of the prediction problems $PP_1 \ldots PP_N$ previously processed by the ML engine 107. If the experiment metadata is not indicated in step 301, one of the prediction problems $PP_1 \ldots PP_N$ which may have been classified as a default prediction problem may be the prediction problem associated with received selection. In both cases, assuming, for example, that the current prediction problem the client system 102a is using is the previously processed prediction problem $PP_N$.

Figure 4:
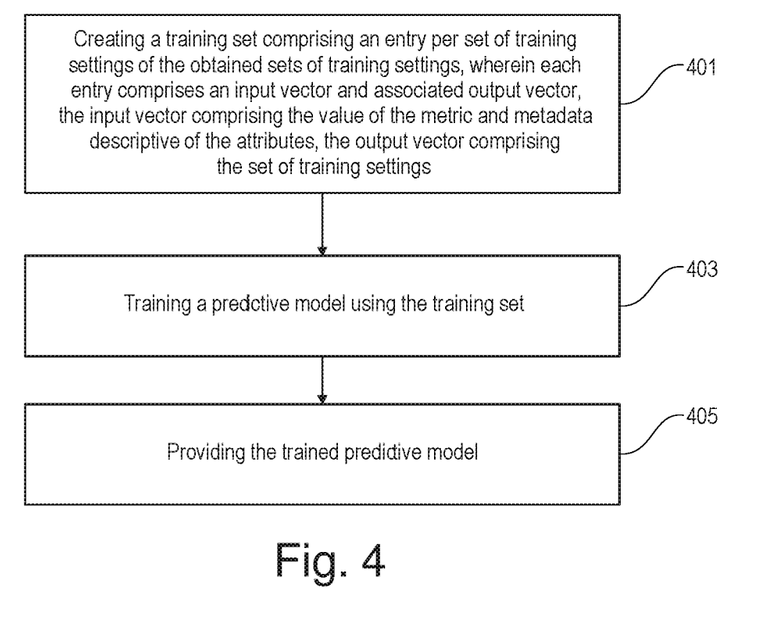
FIG. 4 is a flowchart of a method for determining a set of settings a machine learning model in accordance with an example of the present subject matter.
Figure 5A:
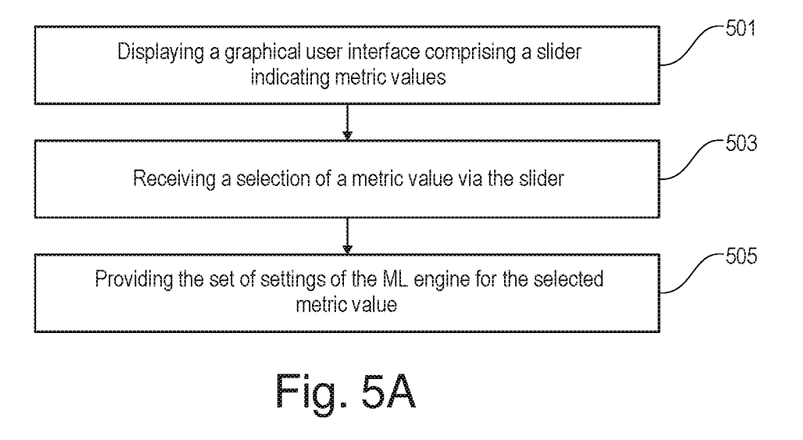
FIG. 5A is a flowchart of a method for determining a set of settings a machine learning model in accordance with embodiments of the present disclosure.

At step 303, ML engine 107 determines a set of training settings that correspond to the desired value of the metric, based on the obtained sets of training settings. For example, as depicted in FIG. 1, G triplets $\{target_1, meta_1^N[s_1^1, s_2^1 \ldots s_{m_N}^1]\} \ldots \{target_G, meta_G^N, [s_1^G, s_2^G \ldots s_{m_N}^G]\}$ associated with the prediction problem $PP_N$ may be used for determining a set of training settings that corresponds to the desired selected value of the metric. In one example implementation of step 303, the desired metric value may be compared with the saved metric values $target_1 \ldots target_G$ and the set of settings associated with the metric value that matches the selected metric value may be the determined set of settings of step 303. The matching metric value $target_1 \ldots$ or $target_G$ may be equal to the selected metric value or may be the closest metric value of the selected metric value. FIGS. 4 and 5A provide other example implementations of step 303.

In step 305, ML engine 107 can generate a machine learning model according to the determined set of training settings based on one or more machine learning models trained on a current training dataset. The current training dataset may include at least columns that represent the feature attribute(s) and label attribute of the current prediction problem $PP_N$.

For example, ML engine 107 may receive the determined set of settings and the current training dataset and may generate the one or more machine learning models for the prediction problem $PP_N$.

The generated machine learning model(s) may be deployed in step 307. This may enable to perform predictions according to the prediction problem $PP_N$. For example, the generated machine learning model(s) may be provided to the client system 102a, so that the system can infer the models.

FIG. 4 is a flowchart of a method for determining a set of settings for generating a machine learning model for a given prediction problem (e.g., $PP_1$ of FIG. 1). The method depicted in FIG. 4 provides implementation details of step 303 of FIG. 3.

In step 401, training system 101 may create a training set. The training set can include an entry per experiment run of the experiment runs used to obtain the tuples for the prediction problems $PP_1, PP_2 \ldots PP_N$. Each entry of the training set comprises an input vector and associated output vector. The input vector comprises the value of the metric of the experiment run and experiment metadata (e.g., ($target_1$, $meta_1^1$)) describing the prediction problem. The output vector comprises the set of settings (e.g., $[s_1^1, s_2^1 \ldots s_{m_1}^1]$) of the experiment run. Following the example of depicted in FIG. 1, the training set may comprise N×G entries: {$target_1$, $meta_1^1$, [$s_1^1$, $s_2^1$ ... $s_{m_1}^1$]}, ... {$target_G$, $meta_G^N$, [$s_1^G$, $s_2^G$ ... $s_{m_N}^G$]}.

A predictive model may be trained in step 403 using the training set for predicting the set of settings. The predictive model may be provided in step 405 e.g., the predictive model may be used to estimate the set of settings in step 303 of the method of FIG. 3.

FIG. 5A is a flowchart of a method for determining a set of settings for generating a machine learning model for a given prediction problem e.g., $PP_1$ according to an example of the present subject matter. For the purpose of explanation, the method described in FIG. 5A may be implemented in the system illustrated in FIG. 1 but is not limited to this implementation. The method of FIG. 5A may, for example, be performed by one of the client systems 102a-n.

Figure 5B:
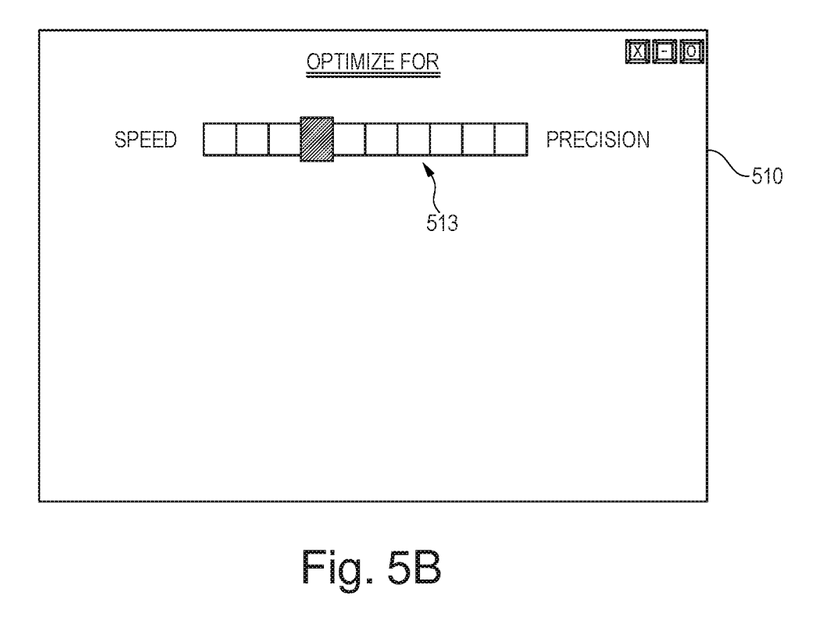
FIG. 5B illustrates a graphical user interface output for training a machine learning model in accordance with embodiments of the present disclosure.

A graphical user interface 510 as shown in FIG. 5B may be displayed in step 501 in the client system 102a. The graphical user interface 510 comprises a slider 513. The slider 513 can be utilized by the user 105a to select a desired value of the runtime (speed) and precision of the machine learning model. The slider is split so that if, for example, the slider is set to value 0.9, it indicates that the precision is 0.9 and the speed is 0.1, that is, the runtime and precision values sum up to one. This may enable to select two metric values with one slider.

Figure 5C:
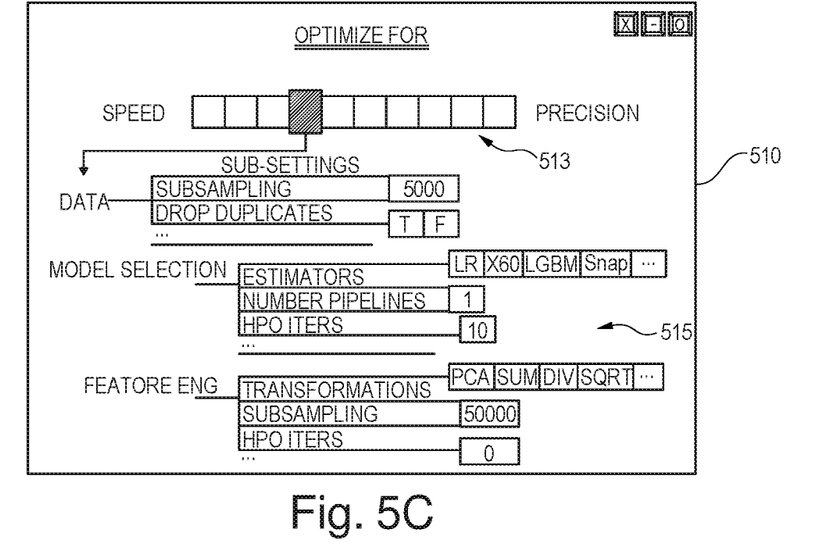
FIG. 5C depicts a graphical user interface output for training a machine learning model in accordance with embodiments of the present disclosure.

Upon selecting in step 503 the desired value of the metric, client system 102a may provide and display in step 505 on graphical user interface 510 as shown in FIG. 5C, the set of settings 515 that correspond to the desired value of the metric. The set of settings 515 may, for example, be the set of settings 200 shown in FIG. 2.

Figure 6:
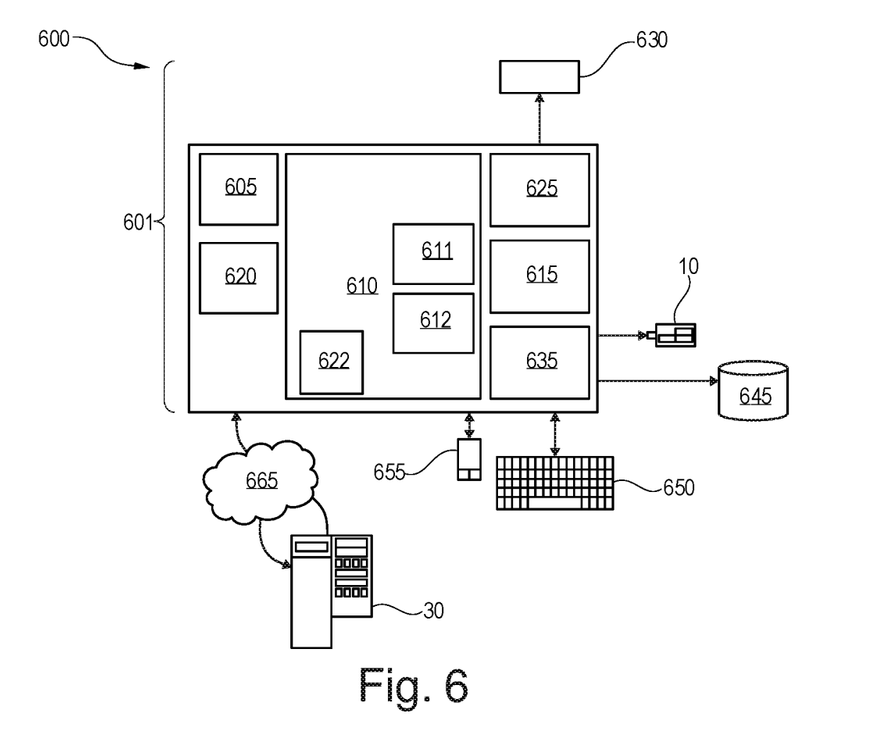
FIG. 6 illustrates an exemplary computing system, generally designated 600, capable of implementing one or more method steps in accordance with embodiments of the present disclosure.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, firmware 622, hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM)), electronically erasable programmable read only memory (EEPROM), programmable read only memory (PROM). Note that the memory 610 can have a distributed architecture, where various components are situated remote from one another, but can be accessed by the processor 605.

The software 612 in memory 610 may include one or more separate programs, each of which comprises an ordered listing of executable instructions for implementing logical functions, notably functions involved in embodiments of this invention. In the example of FIG. 6, software 612 in the memory 610 includes program instructions (e.g., instructions to manage databases such as a database management system).

The software in memory 610 shall also typically include a suitable operating system (OS) 611. The OS 611 essentially controls the execution of other computer programs, such as software 612 for implementing methods as described herein.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
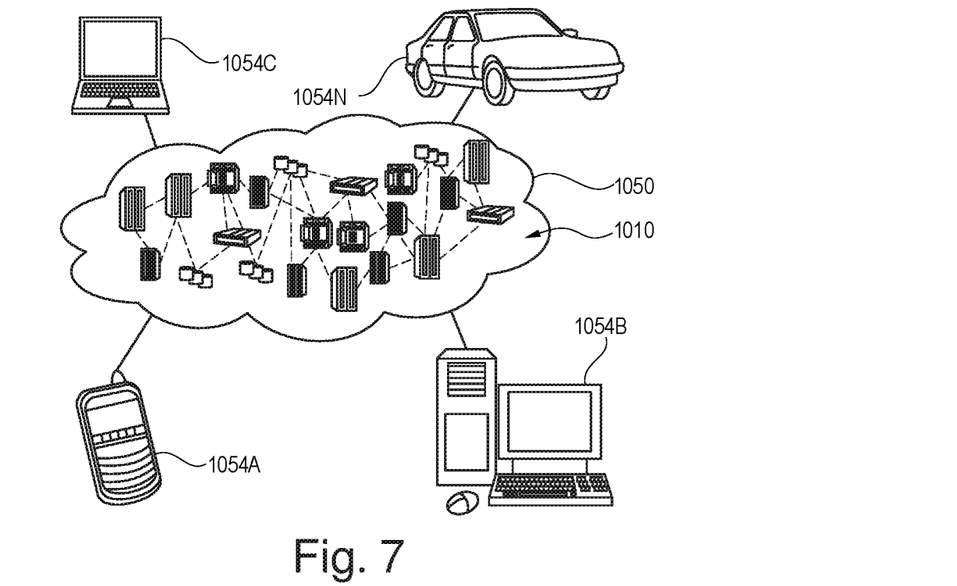
FIG. 7 depicts a cloud computing environment according to an embodiment of the present invention.

Referring now to FIG. 7, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 7 are intended to be illustrative only and that computing nodes 1010 and cloud computing environment 1050 can communicate with any type of computerized device over any type of network and/or network addressable connection (e.g., using a web browser).

Figure 8:
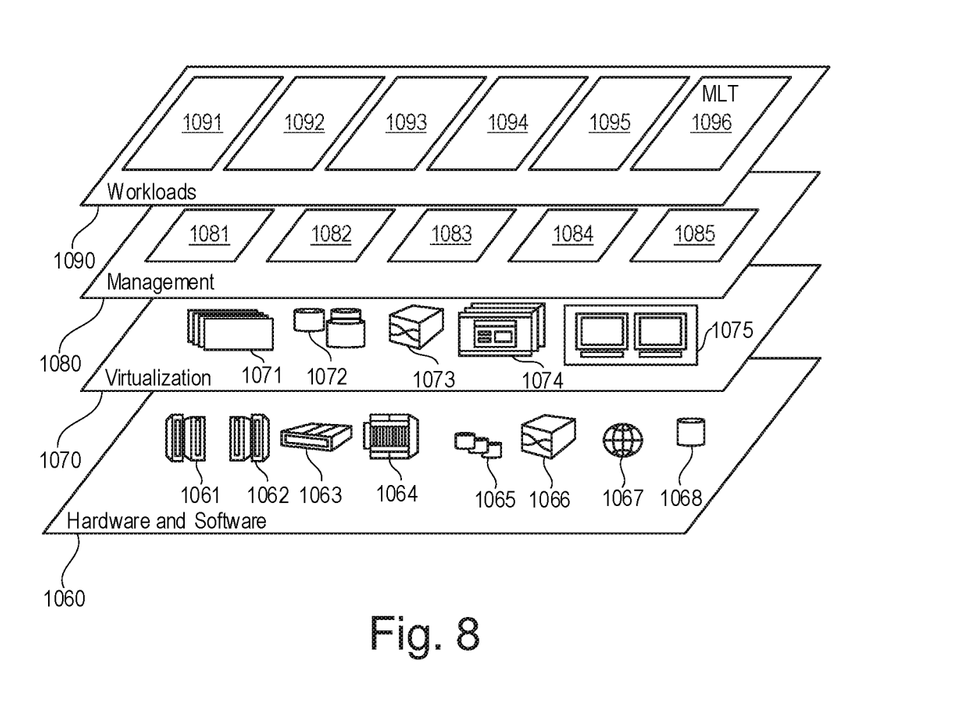
FIG. 8 depicts abstraction model layers according to an embodiment of the present invention.

Referring now to FIG. 8, a set of functional abstraction layers provided by cloud computing environment 1050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a machine learning model training based on metrics (MLT) 1096 in accordance with the present subject matter e.g., as described with reference to FIG. 3, FIG. 4 or FIG. 5A.

The present subject matter may comprise the following clauses.

Clause 1. A computer implemented method comprising: defining a metric for evaluating performances of machine learning (ML) models;
providing an ML engine that is configured to:
  receive a set of training settings and a training dataset comprising a first feature attribute and a first label attribute;
  generate using the training dataset at least one machine learning model according to the set of training settings, the machine learning model being configured to predict the first label attribute from the first feature attribute;
  provide a value of the metric for the generated machine learning model;
  obtaining sets of training settings of previous operations of the ML engine and associated values of the metric;
  receiving a selection of a desired value of the metric for predicting a value of the first label attribute based on a current training dataset;
  using the obtained sets of training settings for determining a set of training settings that corresponds to the desired value of the metric;
  controlling the ML engine to generate using the current training dataset a machine learning model according to the determined set of training settings;
  deploying the generated machine learning model for performing predictions of values of the first label attribute.

Clause 2. The method of clause 1, the determining of the set of training settings comprising:
  creating a training set comprising an entry per set of training settings of the obtained sets of training settings, wherein each entry comprises an input vector and associated output vector, the input vector comprising the value of the metric and metadata descriptive of the attributes, the output vector comprising the set of training settings;
  training a predictive model using the training set for predicting the set of settings by providing as input to the predictive model the desired value of the metric and metadata of the attributes of the current training dataset for receiving as output said determined set of settings.

Clause 3. The method of clause 1, the determining of the set of settings comprising: selecting the set of settings of the obtained set of settings that correspond to the desired value of the metric.

Clause 4. The method of any of the preceding clauses 1 to 3, the set of training settings comprising: a first subset of settings for pre-processing the training dataset, a second subset of settings for selection of one or more learning algorithms that are suitable for the prediction and a third subset of settings for training optimization.

Clause 5. The method of clause 2 or 4, the metadata descriptive of the attributes comprising at least one of: the number of feature attributes, the type of the feature attributes, and the type of the label attribute.

Clause 6. The method of any of the preceding clauses 1 to 5, further comprising normalizing the metric values to a range with a predefined granularity, wherein the obtained sets of the settings are provided according to the granularity so that each set of the obtained sets of settings represents a respective level of granularity.

Clause 7. The method of clause 6, wherein the receiving of the selection comprises receiving a selection of a granularity level.

Clause 8. The method of clause 6 or 7, receiving the selection comprising: displaying a graphical user interface comprising a slider with which a user may set a value by moving an indicator of the slider, the slider comprising the range of normalized values, wherein the set value of the slider is the received selected value of the metric.

Clause 9. The method of any of the preceding clauses 1 to 8, the metric describing a runtime of the training and/or inference of the machine learning model, precision of the machine learning model or a combination thereof.

Clause 10. The method of any of the preceding clauses 1 to 9, the metric being a combination of multiple metric types, wherein each metric type is associated with a distinct set of settings of the sets of settings.

Clause 11. The method of any of the preceding clauses 1 to 10, further comprising logging the determined set of settings and the value of the metric associated with it.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for training a machine learning model comprising:
    receiving a set of training settings and a training dataset comprising a first feature attribute and a first label attribute;
    generating at least one machine learning model based on the training dataset and the set of training settings, wherein the at least one machine learning model is configured to predict the first label attribute from the first feature attribute;
    providing values of a respective performance metric for the generated at least one machine learning model, wherein the respective performance metric corresponds to a respective runtime of the generated at least one machine learning model;
    obtaining sets of training settings of one or more previous operations and associated values of the metric;
    normalizing the provided values of the respective metric to a range with a predefined granularity, wherein each of the obtained sets of the training settings represents a respective level of granularity;
    displaying a graphical user interface, wherein the graphical user interface comprises an input element that allows a user to select a step value for the respective level of granularity;
    receiving, via a user interaction with the input element of the graphical user interface, a desired value for the performance metric via receiving a selection of one of the respective levels of granularity;
    determining a set of training settings that corresponds to the desired value of the performance metric based on the obtained sets of training settings and based on the associated values of the metric;
    generating a new machine learning model based on the determined set of training settings; and
    deploying the generated new machine learning model.

2. The computer-implemented method of claim 1, wherein the determining of the set of training settings comprises:
    creating a training set, wherein the training set is at least one entry per set of training settings of the obtained sets of training settings, wherein each entry is an input vector and an associated output vector, wherein the input vector is the value of the metric and metadata descriptive of the first feature and first label attributes and the output vector is the set of training settings; and
    training a predictive model based on the training set for predicting the set of settings.

3. The computer-implemented method of claim 1, wherein determining of the set of settings comprises:
    receiving a selection of the set of settings of the obtained set of settings that correspond to the desired value of the metric.

4. The computer-implemented method of claim 1, wherein the set of training settings comprises:
    a first subset of settings for pre-processing the training dataset,
    a second subset of settings for selection of one or more learning algorithms that are suitable for the prediction and
    a third subset of settings for training optimization.

5. The computer-implemented method of claim 2, wherein the metadata descriptive of the first feature and first label attributes comprises at least one of:
    a number of feature attributes,
    a type of the feature attributes, and
    a type of the label attribute.

6. The computer-implemented method of claim 1, wherein the input element of the graphical user interface comprises a slider to set the desired value of the respective performance metric for the runtime.

7. The computer implemented method of claim 1, wherein the metric is a combination of two or more metric types, wherein each metric type is associated with a distinct set of settings of the sets of settings.

8. The computer-implemented method of claim 1, further comprising:
    logging the determined set of settings and the value of the metric associated with the determined set of settings.

9. The computer-implemented method of claim 1, further comprising:
    creating a training set comprising an entry per set of training settings of the obtained sets of training settings, wherein each entry comprises an input vector and associated output vector, the input vector comprising the value of the metric and metadata descriptive of the first feature and first label attributes, the output vector comprising the set of training settings; and
    training a predictive model using the training set for predicting the set of settings by providing as input to the predictive model the desired value of the metric and metadata of the attributes of a current training dataset for receiving as output said determined set of settings.

10. A computer system comprising:
    a processor;
    a computer readable storage media; and
    computer program instructions stored on the computer readable storage media for execution by the processor to perform operations comprising:
        receive a set of training settings and a training dataset comprising a first feature attribute and a first label attribute;
        generate at least one machine learning model based on the training dataset and the set of training settings, wherein the at least one machine learning model is configured to predict the first label attribute from the first feature attribute;
        provide values of a respective performance metric for the generated at least one machine learning model, wherein the respective performance metric corresponds to a respective runtime of the generated at least one machine learning model;
        obtain sets of training settings of one or more previous operations and associated values of the respective performance metric;

normalize the provided values of the respective metric to a range with a predefined granularity, wherein each of the obtained sets of the training settings represents a respective level of granularity;

display a graphical user interface, wherein the graphical user interface comprises an input element that allows a user to select a step value for the respective level of granularity;

receive, via a user interaction with the input element of the graphical user interface, a desired value for the respective performance metric via receiving a selection of one of the respective levels of granularity;

determine a set of training settings that corresponds to the desired value of the metric based on the obtained sets of training settings and based on the associated values of the metric;

generate a new machine learning model based on the determined set of training settings; and deploy the new generated machine learning model.

11. The computer system of claim 10, wherein the determining of the set of training settings comprises computer program instructions to:

create a training set, wherein the training set is at least one entry per set of training settings of the obtained sets of training settings, wherein each entry is an input vector and an associated output vector, wherein the input vector is the value of the metric and metadata descriptive of the first feature and first label attributes and the output vector is the set of training settings; and train a predictive model based on the training set for predicting the set of settings.

12. The computer system of claim 10, wherein the operations further comprise:

receiving a selection of the set of settings of the obtained set of settings that correspond to the desired value of the metric.

13. The computer system of claim 10, wherein the set of training settings comprises:

a first subset of settings for pre-processing the training dataset, a second subset of settings for selection of one or more learning algorithms that are suitable for the prediction and a third subset of settings for training optimization.

14. The computer system of claim 11, wherein the metadata descriptive of the first feature and first label attributes comprising at least one of:

a number of feature attributes, a type of the feature attributes, and a type of the label attribute.

15. A computer program product comprising:

a computer readable storage media; and computer program instructions stored on the computer readable storage media for execution by a processor to perform operations comprising:

receive a set of training settings and a training dataset comprising a first feature attribute and a first label attribute;

generate at least one machine learning model based on the training dataset and the set of training settings, wherein the at least one machine learning model is configured to predict the first label attribute from the first feature attribute;

provide values of a respective performance metric for the generated at least one machine learning model, wherein the respective performance metric corresponds to a respective runtime of the generated at least one machine learning model;

obtain sets of training settings of one or more previous operations and associated values of the respective performance metric;

normalize the provided values of the respective metric to a range with a predefined granularity, wherein each of the obtained sets of the training settings represents a respective level of granularity;

display a graphical user interface, wherein the graphical user interface comprises an input element that allows a user to select a step value for the respective level of granularity;

receive, via a user interaction with the input element of the graphical user interface, a desired value for the respective performance metric via receiving a selection of one of the respective levels of granularity;

determine a set of training settings that corresponds to the desired value of the metric based on the obtained sets of training settings and based on the associated values of the metric;

generate a new machine learning model based on the determined set of training settings; and deploy the new generated machine learning model.

16. The computer program product of claim 15, wherein the determining of the set of training settings comprises:

creating a training set, wherein the training set is at least one entry per set of training settings of the obtained sets of training settings, wherein each entry is an input vector and an associated output vector, wherein the input vector is the value of the metric and metadata descriptive of the first feature and first label attributes and the output vector is the set of training settings; and training a predictive model based on the training set for predicting the set of settings.

17. The computer program product of claim 15, wherein determining of the set of settings comprises:

receiving a selection of the set of settings of the obtained set of settings that correspond to the desired value of the metric.

18. The computer program product of claim 15, wherein the set of training settings comprises:

a first subset of settings for pre-processing the training dataset, a second subset of settings for selection of one or more learning algorithms that are suitable for the prediction and a third subset of settings for training optimization.

19. The computer program product of claim 15, wherein the input element of the graphical user interface comprises a slider to set the desired value of the respective performance metric for the runtime.

* * * * *